United States Patent [19]

Artbauer

[11] 4,160,870
[45] Jul. 10, 1979

[54] HIGH VOLTAGE DEVICE WITH GAS INSULATION

[75] Inventor: Jan Artbauer, Langenhagen, Fed. Rep. of Germany

[73] Assignee: Kabel-und Metallwerke Gutehoffnungshutte Aktiengesellschaft, Hannover, Fed. Rep. of Germany

[21] Appl. No.: 354,475

[22] Filed: Apr. 26, 1973

[30] Foreign Application Priority Data

May 5, 1972 [DE] Fed. Rep. of Germany ....... 2222681

[51] Int. Cl.² ............................................. H01B 9/06
[52] U.S. Cl. ................................ 174/14 R; 174/16 B; 174/28
[58] Field of Search ................. 174/17 R, 16 B, 28, 174/29, 99

[56] References Cited

U.S. PATENT DOCUMENTS

| 3,553,410 | 1/1971 | Morva | 174/17 R |
| 3,688,015 | 8/1972 | Graybill | 174/28 X |
| 3,740,925 | 6/1973 | Gothard | 174/16 B UX |

OTHER PUBLICATIONS

Bortnik, I. M., Cooke, C. M., Electrical Breakdown and the Similarity Law in SF$_6$ at Extra High Voltages, 12-9-71.

Primary Examiner—Arthur T. Grimley
Attorney, Agent, or Firm—Smyth, Pavitt, Siegemund, Jones & Martella

[57] ABSTRACT

The purity of gas insulation in a high voltage device is improved by providing those conductor surface therein having relatively low local electric field strength with an exposed layer of adhesive glue to which floating particles will adhere.

1 Claim, 1 Drawing Figure

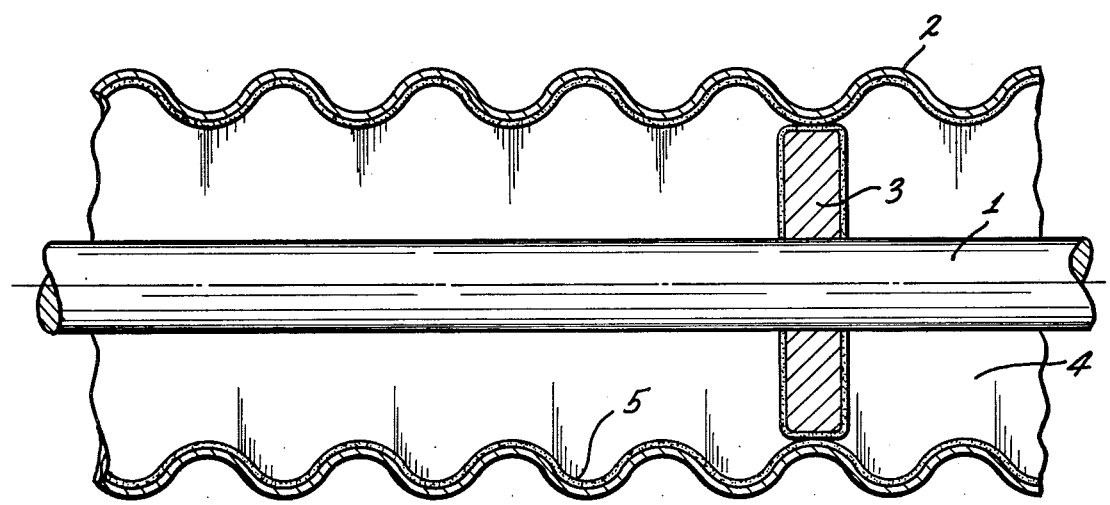

HIGH VOLTAGE DEVICE WITH GAS INSULATION

BACKGROUND OF THE INVENTION

The present invention relates to increasing the electric breakdown voltage of gas-insulated high voltage devices. Particularly and, for example, the invention relates to improvements of the insulative properties of devices such as high voltage cable or high voltage generators with an $SF_6$ atmosphere between the different conductors or electrodes.

The electric strength of high voltage devices with gas insulation is quite frequently reduced due to the presence of solid state impurities such as dirt, dust or other particles floating in the gaseous space of the insulation. Usually, the presence of certain amount of density of such particles must be expected and it is necessary to take such impurities into consideration upon dimensioning and proportioning the device. Particularly, a larger distance between the conductors of different voltage potential must be chosen or the gas pressure must be increased, or both steps must be taken. That, however, is quite undesirable so that usually the gas atmosphere is cleaned beforehand.

Filtering of the gas and cleaning all parts interfacing with the gas, permits indeed, a drastic reduction in the dust etc. concentration. There is, however, a practical limit here so that some foreign particles will remain and removal thereof is usually too expensive, so that it is more economical to offset their presence by higher distances or higher pressure. Clearly, there is a need for simplified purification of the gaseous insulative atmosphere in high voltage devices.

SUMMARY OF THE INVENTION

It is an object of the present invention to improve the electric and insulative strength of a gaseous insulation atmosphere in high voltage devices.

The invention takes particularly into consideration that, as is known, foreign matter floating in the gas insulation influences the effective insulation to an extent that depends on the particular location of the particles. Also, it makes a difference whether or not the particles move. In a given system, any voltage breakdown upon increasing the voltage across the insulative space, is usually initiated by moving particles. Particles clinging to the inner surface of portions of the electrodes with high local electric field strength are also prone to initiate voltage breakdown. Contrary thereto, particles adhering to electrode or conductor surface portions of low field strength may be quite harmless.

In accordance with the preferred embodiment of the invention, floating particles are rendered harmless by causing them to attach predominantly at conductor or electrode surface portions of low local field strength. Particularly, these surface portions are provided with an adhesive layer whose stickiness causes particles to remain adhering once caught. One will use here, preferably a contact adhesive (Haftkleber), for example, on the base of polyvinylesher.

It was found that, for example, during filling of the space between electrodes or conductors with gas, i.e. while the gas flow as such is quite vigorous, most dirt particles will, in fact, contact the adhesive layer and the gas flow is not strong enough to tear them off the glue again. Remaining particles will either float down soon under gravity or the probability is high that sooner or later they will hit a sticky surface under Brownian movement.

Of course, some particles may cling right from the beginning at surface portions that will later exhibit high local electric field strength; some will be removed again by gas flow, but some particles will remain. This may happen, for example, along the surface of the inner conductor in a coaxial cable system. However, one can condition the system in that prior to actual use a high voltage is applied to initiate intentionally local breakdown causing the particles adhering to the critical surface portions to burn off. The power applied here for that purpose is small and can be accurately metered to avoid any damage from the resulting discharges.

The provision of the adhesive layer has the added advantage that in case a local breakdown does occur, any chemical decomposition products in the solid state and produced thereby, will be caught. The high voltage device may be of the type that produces heat during operation. In this case, an adhesive should be used with a high coefficient of emission of thermal radiation. Accordingly, heat removal by radiation is improved and the system can take up a higher load than without such removal. It should be noted that high voltage devices have usually bright polished metal surfaces which have per se a small coefficient of radiation emission and absorbtion. The glue may be provided with a suitable pigmentation.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE shows somewhat schematically an example for practicing the preferred embodiment of the invention.

The drawing shows a cross section through a high voltage cable 1 with an inner conductor 1, an outer envelope 2, a spacer 3 (one of many) and gas insulation 4 in the space between conductor core and envelope. The gas is preferably $SF_6$. Upon applying a voltage to the conductors, an electric field exists across the gas filled insulating space and that field has maximum value adjacent conductor 1; minimum values for that field are found adjacent envelope 2. The field strength is not uniform adjacent the envelope's surface because of the corrugation. The field strength is somewhat higher adjacent the inwardly facing corrugation crests than in the corrugation valleys in-between. Actually, the field strength is quite low in these valleys.

In accordance with the invention, an adhesive layer 5 is provided along the inner surface of envelope 2. Dust, dirt and other particles entering the space which passed any filter, will very soon attach themselves to layer 5. This way, they will be prevented from clinging to conductor 1, and they will only negligibly influence the electric insulative strength of the device. It should be noted that as long as the cable encapsulation remains tight and sealed, no new dust and other particles will enter. Therefore, even if the glue should harden after a while, it will have fulfilled its function by that time.

The adhesive may be provided with pigmentation or may be black to begin with, so that the layer has a high coefficient of radiation emission and absorption close to unity. Accordingly, the heat removal capability of the cable is enhenced and the cable can be rated for higher load.

The invention is not limited to the embodiments described above but all changes and modifications thereof not constituting departures from the spirit and scope of the invention are intended to be included.

I claim:

1. In a high voltage cable having concentric inner and outer conductors provided for conducting different voltage potentials and being separated by an insulative gas, the improvement comprising:

an adhesive layer deposited on the inner surface of the outer conductor only, and including pigmentation for enhancement of the radiation emission and absorption relative to the respective conductor surface portion, said surface having lower local electric field strength than the field strength adjacent to the surface of the inner conductor when said different potentials are being applied to the inner and outer conductors, the layer being sticky and exposed to the gas for gathering dust and dirt, particularly before said potentials are applied to the conductors, the surface of the inner conductor being free from such adhesive layer.

* * * * *